July 3, 1923.
S. B. HENSHAW
1,460,582
METHOD OF AND APPARATUS FOR DRAWING SHEET GLASS
Filed June 19, 1920 2 Sheets-Sheet 1
Fig.1.
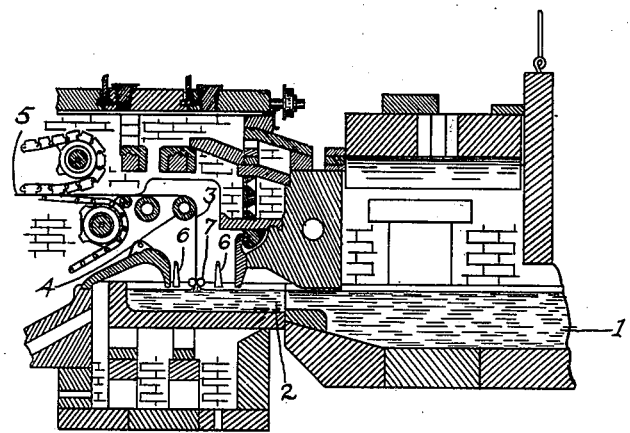
Fig.3.
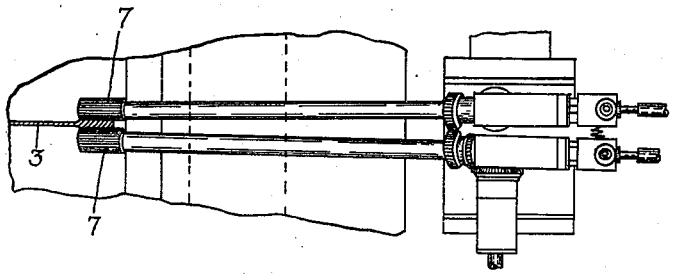
Fig.5.    Fig.4.
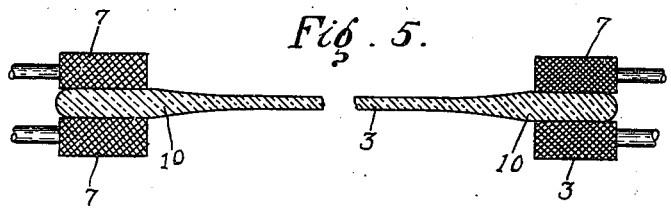 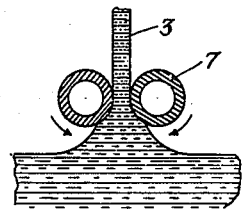
Fig.6.
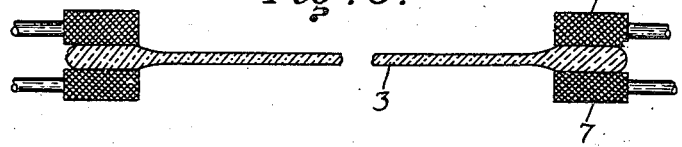
Inventor
Seth B. Henshaw
By Whittemore Hulbert & Whittemore.
Attorneys

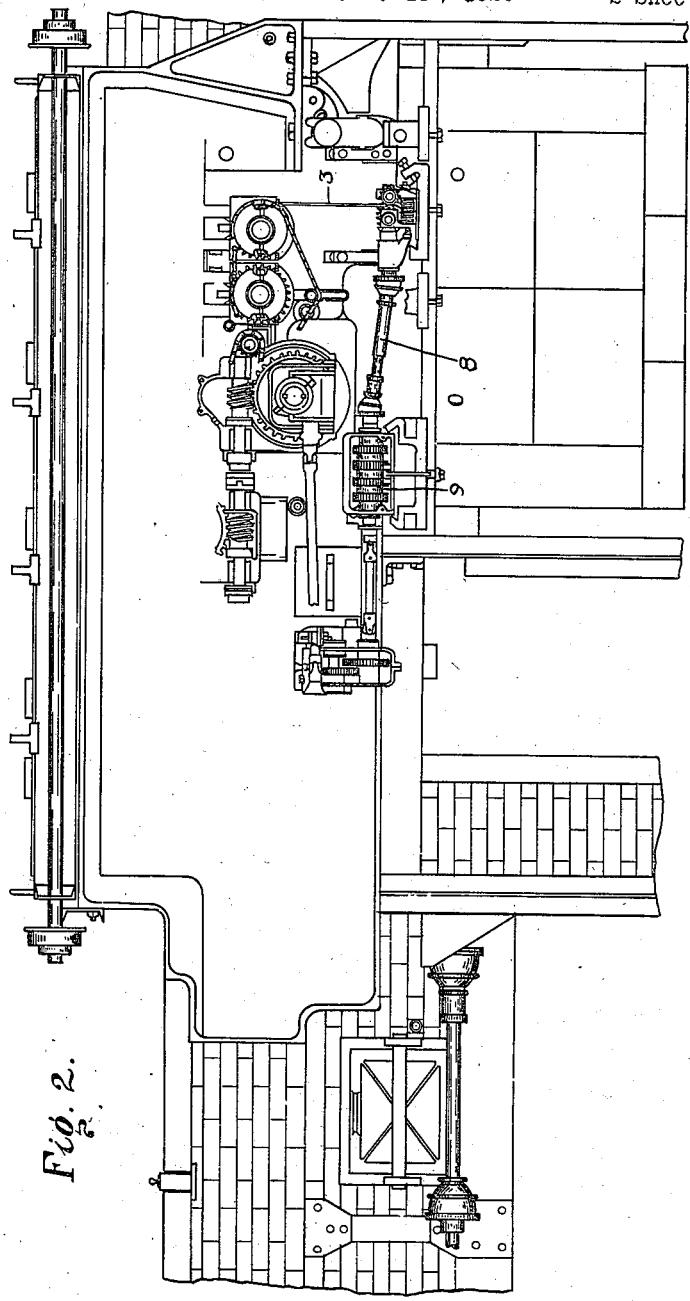

Patented July 3, 1923.

1,460,582

UNITED STATES PATENT OFFICE.

SETH B. HENSHAW, OF CHARLESTON, WEST VIRGINIA, ASSIGNOR TO THE LIBBEY-OWENS SHEET GLASS COMPANY, OF TOLEDO, OHIO, A CORPORATION OF OHIO.

METHOD OF AND APPARATUS FOR DRAWING SHEET GLASS.

Application filed June 19, 1920. Serial No. 390,062.

*To all whom it may concern:*

Be it known that I, SETH B. HENSHAW, a citizen of the United States of America, residing at Charleston, in the county of Kanawha and State of West Virginia, have invented certain new and useful Improvements in Methods of and Apparatus for Drawing Sheet Glass, of which the following is a specification, reference being had therein to the accompanying drawings.

The invention consists of a method and apparatus for drawing window glass, particularly in a method and means for increasing the amount of marketable glass produced with sheet glass drawing apparatus; as more particularly hereinafter set forth.

My improved method and apparatus were designed as an improvement upon the method and apparatus shown and described in patent to Irving W. Colburn, No. 1,248,809, of December 4, 1917, and particularly to avoid certain waste at the edges of the sheet which occurs in the use of such Colburn apparatus.

In the drawings, Figure 1 is a vertical section of a drawing apparatus of the type shown in Colburn patent above referred to; Figure 2 is a side elevation of the tank and drawing mechanism, showing only a portion of the drive mechanism described in said patent—as the details thereof have nothing to do with the invention here involved; Figure 3 is a plan view of the drive mechanism, showing one pair of knurled rolls used at the edge of the sheet; Figure 4 is a vertical section through those rolls, showing the relationship between the rolls and the glass being drawn; Figure 5 is a section through the drawn sheet, showing the two edge rolls and illustrating the cross-section of the sheet as drawn by such Colburn apparatus; and Figure 6 is a similar cross-section illustrating the form of sheet drawn by my improved process.

As the Colburn process is now well-known and in commercial use, it is not necessary to more than briefly describe that portion of the apparatus which is thus known:

I have illustrated at 1 the cooling tank into which the glass flows from the melting tank (not shown), and at 2 the drawing tank from which the sheet glass, 3, is first drawn vertically a short distance and over a bending roll, 4, and then into a horizontal run, 5, to which the drawing mechanism (not shown) is applied. 6 represents the coolers for lowering the temperature of the glass flowing to the drawing-point: 7, the edge rolls, pairs of which are applied to each edge of the sheet to maintain the sheet in uniform width during the drawing operation. These rolls, as is well-known, are cooled, and are driven as shown by the arrows in Fig. 4; a pair of the same being applied to each edge of the sheet. Any suitable driving means may be employed for these edge rolls, and I have here illustrated in Fig. 2 a drive shaft 8 which may be driven from any suitable source, preferably with a change-speed drive, 9, so that the speed of the rolls may be varied.

As is well-known at the present time, it is desirable to maintain the glass which is flowing to the edge portions of the sheet for forming the edges, at a lower temperature than that portion of the glass which is to make the body of the sheet; and the edges are preferably formed thicker than the body of the sheet, this being accomplished by placing the edge rolls, 7, a greater distance apart than the thickness of the sheet, 3, to be drawn.

As pointed out, in Colburn Patent 1,248,-809, patented December 4, 1917, the edge rolls are driven at a lower speed than the speed at which the glass is drawn from the tank. The difference in speed, as pointed out in said patent, is about ten per cent to twenty per cent less for the edge rolls as compared with the speed of drawing the sheet. The purpose of this reduction in speed of the edge rolls is to produce a tension upon the edges (which are cooled by the water-cooled edge rolls) and create stiff edges—stiff not only from the lower temperature but also from the tension applied thereto; to prevent vertical waves or corrugations in the sheet, as well as the narrowing thereof during the drawing operation.

In carrying out this Colburn process with the apparatus shown in said patent, it has been found that between the edge rolls and the sheet body proper is a thick zone of glass (as shown in Fig. 5) which I have numbered 10; which varies in thickness at different points and varies in width from one to three or four inches at each side of the sheet. When this sheet of glass thus drawn passes out of the leer onto the cutting-table, these thickened side portions, 10, on each side of the sheet are cut off by cutters and broken up and used for cullet. I have discovered that the great bulk, if not all, of these thickened edge portions between the edge rolls and the sheet body proper can be eliminated and the sheet caused to draw to gauge practically up to the inner ends of the edge rolls; which improvement is accomplished by driving the edge rolls at a very much lower speed than the sheet is drawn.

I have produced very successful results in this regard by driving the edge rolls at only one-fourth of the speed of the drawn sheet, that is, drawing the sheet three times faster than the peripheral speed of the edge rolls. In order to get the best results, the edge rolls should be driven at not to exceed one-half of the speed of the sheet proper— and preferably as low as one-third or one-fourth of the speed of the sheet; depending somewhat upon the thickness of the glass to be drawn and the conditions under which the machine is operated. The effect of this very greatly reduced speed for the edge rolls practically eliminates the one to three inches of waste at the edges between the edge rolls and the main body of the sheet, and thus saves from two to six inches of glass that, in the Colburn process and apparatus, was cut off and made into cullet.

By this extra tension to the edge portions, the glass at the edge necessarily is stretched more and thus reduced in thickness, so that the amount of glass in that portion of the edge which is cut off is reduced in weight— and a further saving thus effected in the amount of cullet produced. It is difficult to say just why this intermediate edge zone is drawn to gauge by this reduced speed of the edge rolls, but my theory of it is that it is stretched to gauge somewhere between the point it leaves the tank and its point of contact with the bending roll; as it probably does not leave the glass mass in any different form than it did when drawn with the apparatus shown and described in the previously-mentioned Colburn patent.

What I claim as new is:

1. In a sheet glass drawing apparatus, means for drawing a flat sheet from the glass mass and rolling dies engaging the edges of the sheet near its source driven to have a peripheral speed of not to exceed one-half the speed at which the sheet is drawn.

2. In a sheet glass drawing apparatus, means for drawing a flat sheet from the glass mass and rolling dies engaging the edges of the sheet near its source driven to have a peripheral speed not to exceed one-third the speed at which the sheet is drawn.

3. The method of drawing sheet glass consisting in drawing a flat sheet from the molten mass, and retarding the edge portions so that they start at a speed of not over one-third the speed of the sheet body.

4. The method of drawing sheet glass consisting in drawing a flat sheet from the molten mass and giving at least twice as much tension to the edge portions as to the body of the sheet.

5. Method of drawing sheet glass consisting in drawing a flat sheet from the molten mass, cooling the edges immediately at the point they leave the mass and applying more than twice as much tension to these cooled edges as to the sheet body.

In testimony whereof I affix my signature.

SETH B. HENSHAW.